United States Patent

Rinzaki

[11] Patent Number: 5,928,043
[45] Date of Patent: Jul. 27, 1999

[54] AIR INTAKE ARRANGEMENT FOR OUTBOARD MARINE ENGINES

[75] Inventor: Shoichi Rinzaki, Wako, Japan

[73] Assignee: Honda Giken Kogyo Kabushiki Kaisha, Tokyo, Japan

[21] Appl. No.: 08/994,317

[22] Filed: Dec. 19, 1997

[30] Foreign Application Priority Data

Dec. 19, 1996 [JP] Japan ................................. 8-340076

[51] Int. Cl.6 ................................................. B63H 21/24
[52] U.S. Cl. ............................... 440/77; 181/229; 440/88
[58] Field of Search ............................... 440/77, 88, 900; 181/229; 123/195 P

[56] References Cited

U.S. PATENT DOCUMENTS 3,610,198 10/1971 Alexanddrowicz ........................ 440/77
4,860,703 8/1989 Boda et al. .................................. 440/88

FOREIGN PATENT DOCUMENTS 3-51700 5/1991 Japan .

Primary Examiner—Ed L. Swinehart
Attorney, Agent, or Firm—Skjerven, Morrill, MacPherson, Franklin & Friel LLP

[57] ABSTRACT

In an outboard marine engine, an air intake passage is mostly defined by a partition wall which extends substantially horizontally inside the engine cover so as to define an air introduction chamber above an engine room accommodating an engine. The air intake passage is defined in such a manner that the intake air is initially guided along a horizontal path between upper and lower plates, and is forced upward through an opening in the upper plate by a first vertical baffle plate extending between front edges of the upper and lower plates before it goes over a second vertical baffle plate extending from the upper plate and finally enters the engine room. Therefore, any heavier contents such as water droplets are effectively removed from the intake air by the actions of inertia and the gravitational force. Because the intake air passage is mostly defined by the partition wall, any design change in the air intake arrangement can be readily and economically accommodated by changing the partition wall.

5 Claims, 3 Drawing Sheets

AIR INTAKE ARRANGEMENT FOR OUTBOARD MARINE ENGINES

TECHNICAL FIELD

The present invention relates to an air intake arrangement for outboard marine engines, and in particular to such an air intake arrangement which can effectively remove water droplets and other foreign matters from the intake air of the engine.

BACKGROUND OF THE INVENTION

An outboard marine engine is typically covered by an engine cover so that splashes and water drops that may be included in the intake air may be effectively removed before they reach the engine. To achieve such a goal, it has been proposed, for instance in Japanese utility model publication (kokai) No. 3-51700, to provide a highly tortuous air intake passage. It has also been proposed to provide an upwardly extending cylindrical duct in the manner of a smoke stack.

However, provision of such a vertically projecting duct unacceptably increases the vertical dimension of the engine assembly. Providing such a duct inside the engine cover inevitably leads to an interference with the engine main body, and even more undesirable problems will be created. For one thing, the internal structure of the engine cover becomes unacceptably complex, not to mention the overall increase in the size of the outer profile. When the intake passage is made tortuous so that water droplets may be separated from the intake air as it passes through the intake passage, it become extremely difficult to change the design of the engine cover afterwards. It is often necessary to make small modifications to the engine cover after it is initially designed. For instance, when the passage diameter is required to be changed, when the performance of the water droplet separation has to be improved, or when the noise of the intake air flow is required to be controlled, the design of the entire engine cover having a relatively large size is required to be changed, and such a need resulted in a substantial increase in the manufacturing cost.

BRIEF SUMMARY OF THE INVENTION

In view of such problems of the prior art, a primary object of the present invention is to provide an air intake arrangement for outboard marine engines which allows a compact design of the outboard marine engine while effectively separating water droplets from the intake air.

A second object of the present invention is to provide an air intake arrangement for outboard marine engines which offers a freedom of design change.

According to the present invention, these and other objects can be accomplished by providing an air intake arrangement for an outboard marine engine assembly which is adapted to be tilted up and laterally swiveled, the engine assembly including a propulsion unit, and an engine mounted to an upper end of the propulsion unit, comprising: an engine cover covering the engine, and including a horizontally elongated slot defined in a rear part of the engine cover; and a partition wall extending substantially horizontally inside the engine cover so as to define an air introduction chamber above an engine room accommodating an engine; the partition wall including a lower plate extending horizontally along a lower edge of the slot, an upper plate extending horizontally along an upper edge of the slot, a first vertical baffle wall extending between front edges of the upper and lower plates, an opening formed in a part of the upper plate adjacent to the first vertical baffle wall, and a second vertical baffle wall extending vertically along a front edge of the opening.

Thus, the intake air is initially guided along a horizontal path between the upper and lower plates, and is forced upward through the opening by the first vertical baffle plate before it goes over the second vertical baffle plate and finally enters the engine room. Therefore, any heavier contents such as water droplets are effectively removed from the intake air by the actions of inertia and the gravitational force. When the lower plate is given with a slight incline which falls toward the slot, the water which may deposit on the lower plate is forced out of the slot by the gravitational force.

Because the intake air passage is mostly defined by the partition wall, any design change in the air intake arrangement can be readily and economically accommodated by changing the partition wall.

According to a preferred embodiment of the present invention, the front edge of the opening extend somewhat short of the first vertical baffle wall. Additionally, front edges of the lower and upper plates as well as the first vertical baffle plate 18c define an arcuate shape as seen from above. Thereby, the water residue which may be present in the air introduction chamber is allowed to be stored in a recess defined in the innermost part of the passage between the upper and lower plates when the engine assembly is tilted upward around the tilt shaft to lift the engine assembly out of the water, and the water is allowed to flow along the first vertical baffle plate and eventually flow out of the slot as the engine assembly is turned in a side down orientation around the swivel shaft. Therefore, the water is prevented from going over the second vertical baffle plate and entering the engine room. Also when the engine is tilted up and restored to the operational position without turning it around the swivel shaft, the water that may be present on the lower plate is again allowed to safely flow out of the slot.

Optionally, the partition wall may be provided with an additional opening for communicating a ventilation hole of a belt cover of the engine with an outer opening formed in the engine cover.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
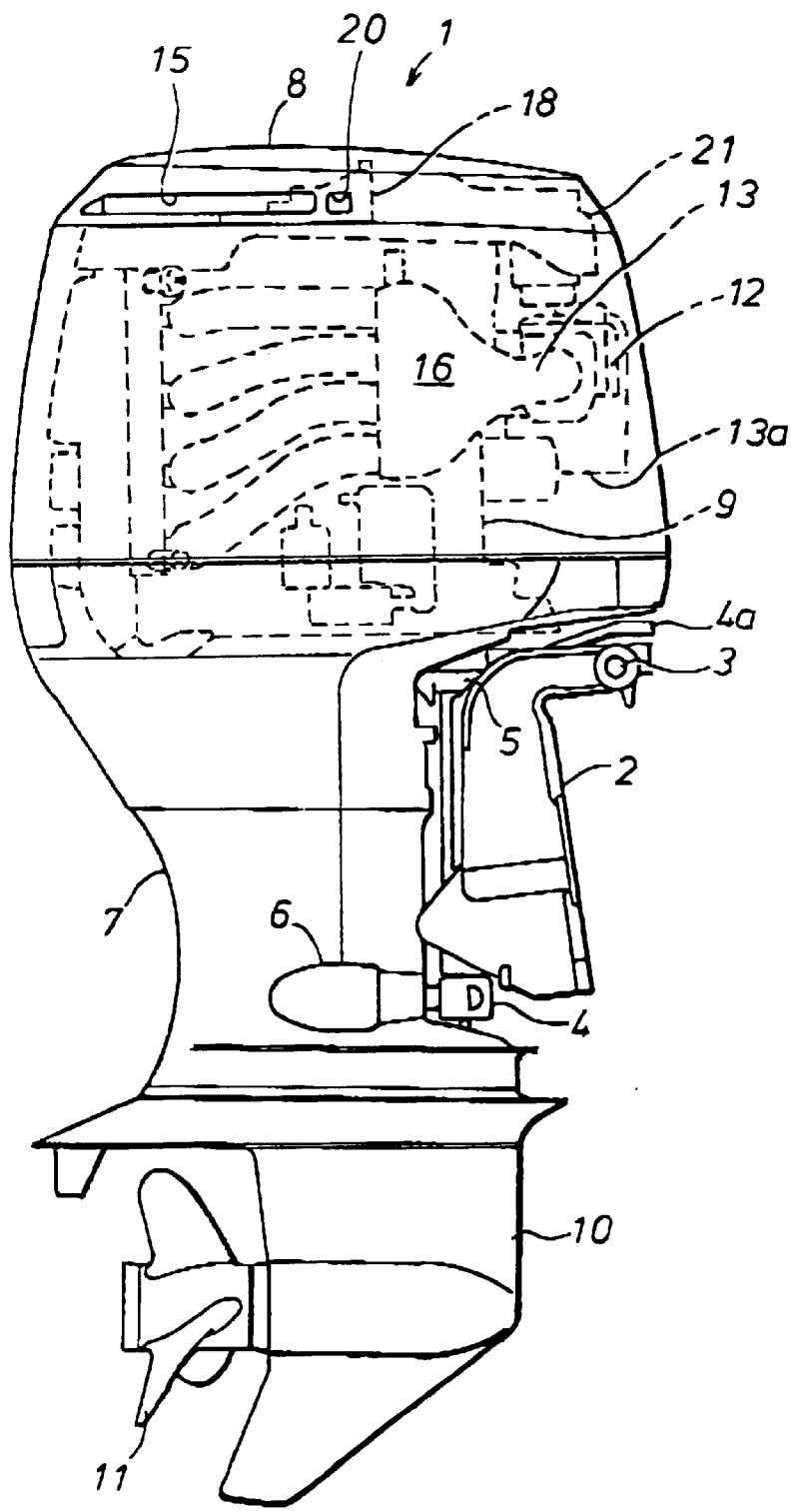
FIG. 1 is a see-through side view of an outboard marine engine assembly embodying the present invention.

FIG. 1 generally illustrates an outboard marine engine assembly 1 embodying the present invention. This outboard marine engine assembly 1 is attached to a stern board of a boat (not shown in the drawing) via a stern bracket 2 equipped with clamping means. To the stern bracket 2 is connected a swivel case 4 so as to be tiltable via a tilt shaft 3 extending laterally and horizontally with respect to the boat. The swivel case 4 is provided with a vertical swivel shaft (not shown in the drawing) to allow the engine main body to be swung laterally for steering the boat. Upper and lower mount arms 5 and 6 extend rearwardly from swivel case 4, and an extension case 7 accommodating a propeller shaft (not shown in the drawing) is supported by free ends of these mount arm 5 and 6.

A steering arm 4a integrally formed with the swivel shaft extends in the forward direction so that the steering of the boat can be accomplished by moving the steering arm 4a in either lateral direction via the lateral swinging motion of the engine main body.

An engine 9 is placed above the extension case 7, and is generally covered by an engine cover 8. A gear case 10 supporting a screw propeller 11 is attached to a lower end of the extension case 7.

The engine 9 consists of a vertical crankshaft engine having a crankshaft which is oriented vertically in use, and, in this particular embodiment, consists of a water-cooled four-cylinder, four-stroke engine. A throttle body 12 is placed on the front end of the assembly. A manifold assembly 13 extends from a starboard side of the cylinder head in a rear end portion of the assembly 1 to the throttle body 12, in the shape of letter L as seen from above. The manifold assembly 13 comprises four intake tubes extending from the cylinder head and a surge tank which joins the four intake tubes and is connected to the throttle body 12. The inlet end of the throttle body 12 is connected to a suction chamber which has an air inlet opening 13a directed downward.

Figure 2:
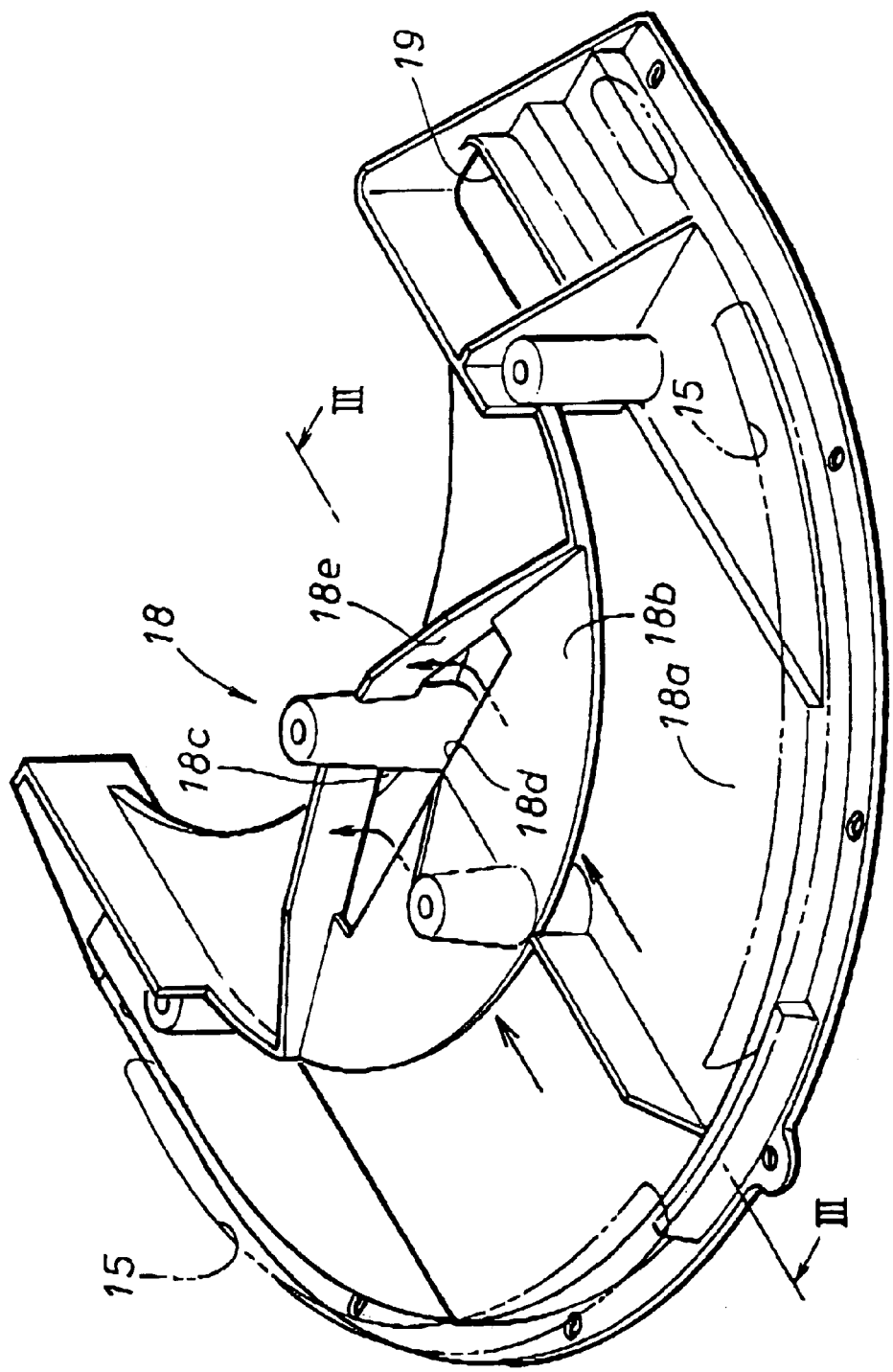
FIG. 2 is a perspective view of the partition wall member.
Figure 3:
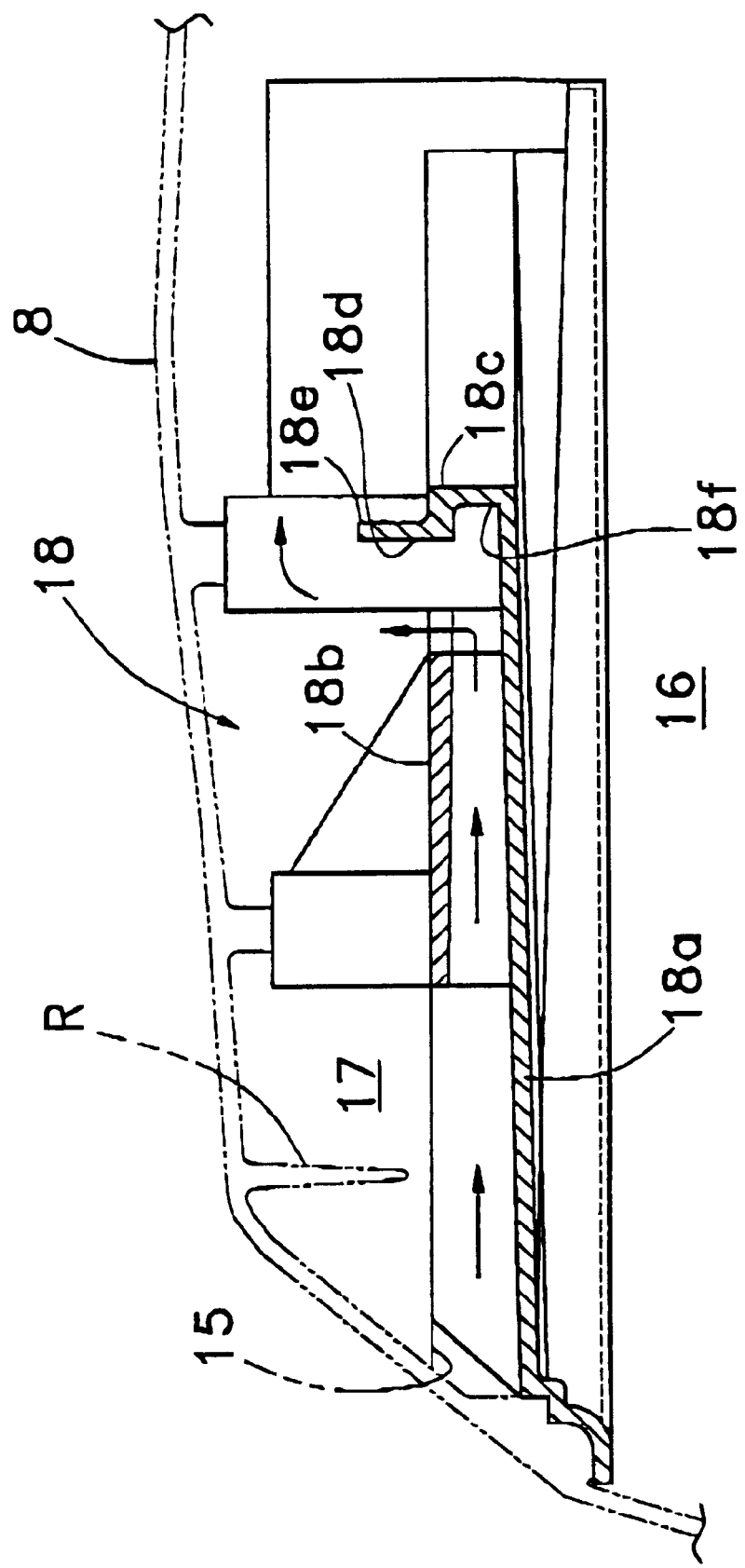
FIG. 3 is a sectional view taken along line III—III of FIG. 2.

Referring to FIGS. 2 and 3, horizontally elongated slots 15 are formed in an upper part of the engine cover 8 along a common horizontal plane for introducing fresh air. A horizontally extending partition wall 18 extends immediately below the slots 15 so as to separate the interior of the engine cover 8 into an air introduction chamber 17 directly communicating with the slots 15 and an engine room 16 defined under the partition wall 18 and accommodating the engine 9 therein. The partition wall 18 may be made of synthetic resin or other corrosion resistant material. The partition wall 18 defines an intake air passage which directs the intake air upward immediately after it is introduced into the air introduction chamber 17, and then directs it downward into the engine room 16 as indicated by arrows in FIG. 2. As the intake air is thus guided, water droplets which may be contained in the intake air is separated by the actions of an inertia effect and the gravitational force.

More specifically, the partition wall 18 comprises a lower plate 18a which extends horizontally along the lower edges of the slots 15 and defines the upper end of the engine room 16, an upper plate 18b which extends horizontally along the upper edges of the slots 15, a first vertical baffle plate 18c extending vertically between the front edges of the lower and upper plates 18a and 18b so as to enclose the front end of an air passage defined between the lower and upper plates 18a and 18b, an opening 18d formed in a part of the upper plate 18a near the first vertical baffle plate 18c, and a second vertical baffle plate 18e extending vertical V from the upper surface of the upper plate 18b along the front edge of the opening 18d. As illustrated in FIG. 2, the second vertical baffle plate 18e extends laterally beyond the side edges of the opening 18d. The front edge of the lower and upper plates 18a and 18b as well as the first vertical baffle plate 18c define an arcuate shape as seen from above.

The fresh air introduced from the slots 15 passes into a space defined between the lower and upper plates 18a and 18b, and travels a certain distance horizontally. The air is then obstructed by the first vertical baffle plate 18c and is guided upward through the opening 18d by the second vertical baffle plate 18e. Thereafter, the air flow goes over the second vertical baffle plate 18e, and flows downward into the engine room 16. There is a slight incline in the lower plate 18a so that water which may deposit thereon is allowed to flow out of the slots 15 under the action of the gravitational force. The front edge of the opening 18d is located slightly short of the first vertical baffle plate 18c so that a recess 18f is defined in the innermost part of the space defined between the lower and upper plates 18a and 18b.

When stowing away the engine assembly, the engine assembly 1 as tilted upward around the tilt shaft 3 to lift the engine assembly out of the water, for instance by more than 70 degrees, and is then steered around the swivel shaft so as to face a side of the engine assembly down. Under such a condition, the water residue which may be present in the air introduction chamber 17 is allowed to be stored in the recess 18f when the engine assembly is tilted up, and the water is allowed to flow along the first vertical baffle plate 18c and eventually flow out of the slots 15 as the engine assembly 1 is turned in a side down orientation around the swivel shaft. Therefore, the water is prevented from going over the second vertical baffle plate 18e and entering the engine room 16. Also when the engine is tilted up and restored to the operational position without turning it around the swivel shaft, the water that may be present on the lower plate 18a is again allowed to flow out of the slots 15.

Another opening 19 is formed in the partition wall 18 on one side of the first vertical baffle plate 18c to supply ventilation and cooling air for the timing belt or the like in the engine room 16, and this opening 19 communicates with an outer opening 20 formed in the engine cover 8 next to one of the slots 15 as illustrated in FIG. 1. The vertical wall surrounding the opening 19 defines a substantially enclosed duct leading to the outer opening 20 in cooperation with the inner surface of the engine cover 8. The opening 19 also aligns with an opening (not shown in the drawing) provided in a belt cover 21 of the engine.

In FIG. 3, letter R denotes a rib which reinforces the part of the engine cover 8 surrounding the slots 15, and additionally extends downwards to a level adjacent to that of the upper plate 18b, and along the outer periphery of the upper plate 18b so that water droplets which may be included in the fresh air may be forced under the upper plate 18b by the rib R. If desired, the rib R may reach a level substantially below the level of the upper plate 18b to enhance the effect of a baffle plate.

Thus, the partition wall 18 defines an intake air passage and baffle plates which are designed to effectively remove water droplets from the intake air in cooperation with the engine cover 18 itself. Furthermore, the air intake arrangement can be readily modified by changing the partition wall, and it can be relatively economically and easily accomplished as compared to the conventional arrangement which required the entire engine cover to be changed even for a slight design modification.

Although the present invention has been described in terms of a preferred embodiment thereof, it is obvious to a person skilled in the art that various alterations and modifications are possible without departing from the scope of the present invention which is set forth in the appended claims. For instance, the opening for introducing fresh air consisted of laterally elongated slots 15 in the above described embodiments, but they may be replaced with openings of other sorts, such as a large number of small holes, and a single slot extending over a relatively large distance, without departing from the broad concept of the present invention believed to be covered by the appended claims.

What we claim is:

1. An air intake arrangement for an outboard marine engine assembly which is adapted to be tilted up and laterally swiveled, said engine assembly including a propulsion unit, and an engine mounted to an upper end of said propulsion unit, comprising:

an engine cover covering said engine, and including a horizontally elongated slot defined in a rear part of said engine cover; and a partition wall extending substantially horizontally inside said engine cover so as to define an air introduction chamber above an engine room accommodating an engine;

said partition wall including a lower plate extending horizontally along a lower edge of said slot, an upper plate extending horizontally along an upper edge of said slot, a first vertical baffle wall extending between front edges of said upper and lower plates, an opening formed in a part of said upper plate adjacent to said first vertical baffle wall, and a second vertical baffle wall extending vertically along a front edge of said opening.

2. An air intake arrangement according to claim 1, wherein said front edge of said opening extends somewhat short of said first vertical baffle wall.

3. An air intake arrangement according to claim 2, wherein front edges of said lower and upper plates as well as said first vertical baffle plate define an arcuate shape as seen from above.

4. An air intake arrangement according to claim 1, wherein said lower plate is given with a slight incline which falls toward said slot.

5. An air intake arrangement according to claim 1, wherein said partition wall is provided with an additional opening for communicating a ventilation hole of a belt cover of said engine with an outer opening formed in said engine cover.

* * * * *